A. O. LEE.
CONTROLLING MECHANISM FOR TRACTION DRIVEN HEADERS.
APPLICATION FILED APR. 18, 1913.

1,154,703.

Patented Sept. 28, 1915.
2 SHEETS—SHEET 1.

Witnesses:
E. C. Skinkle
Geo. Knutson

Inventor:
Albert O. Lee
By his Attorneys;
Williamson Merchant

A. O. LEE.
CONTROLLING MECHANISM FOR TRACTION DRIVEN HEADERS.
APPLICATION FILED APR. 18, 1913.
1,154,703.
Patented Sept. 28, 1915.
2 SHEETS—SHEET 2.
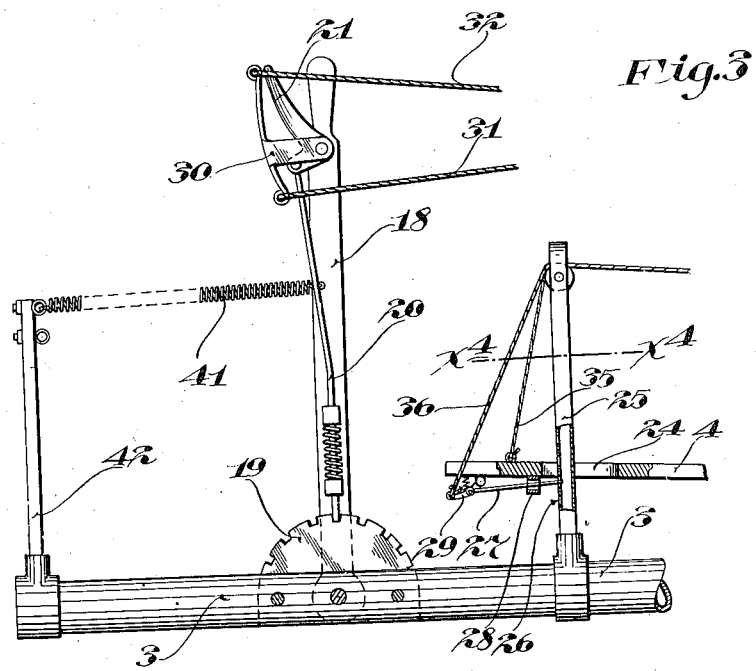
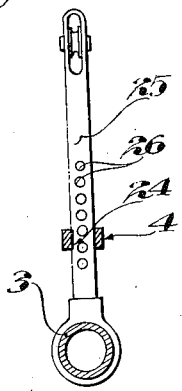
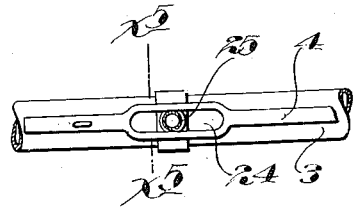
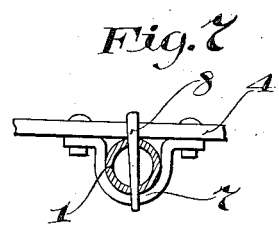
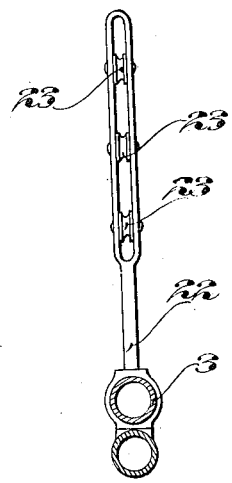
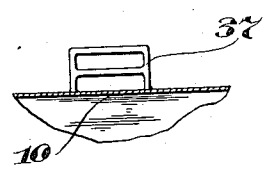
Witnesses:
E. C. Skinkle
Geo. Knutson
Inventor:
Albert O. Lee
By his Attorneys
Williamson Merchant

UNITED STATES PATENT OFFICE.

ALBERT O. LEE, OF MINNEAPOLIS, MINNESOTA.

CONTROLLING MECHANISM FOR TRACTION-DRIVEN HEADERS.

1,154,703.  Specification of Letters Patent.  Patented Sept. 28, 1915.

Application filed April 18, 1913. Serial No. 761,990.

*To all whom it may concern:*

Be it known that I, ALBERT O. LEE, a citizen of the United States, residing at Minneapolis, in the county of Hennepin and State of Minnesota, have invented certain new and useful Improvements in Controlling Mechanism for Traction-Driven Headers; and I do hereby declare the following to be a full, clear, and exact description of the invention, such as will enable others skilled in the art to which it appertains to make and use the same.

My invention has for its object to provide a simple and efficient controlling mechanism, whereby in a traction rig including a harvester of the header type, and a traction engine connected to push the same, the driver of the traction engine from his position on the engine may control, for example, the tilt of the platform, the movements of the reel, and the position of the binder.

To the above ends, generally stated, the invention consists of the novel devices and combinations of devices hereinafter described and defined in the claims.

In the accompanying drawings which illustrate the invention, like characters indicate like parts throughout the several views.

Figure 1:
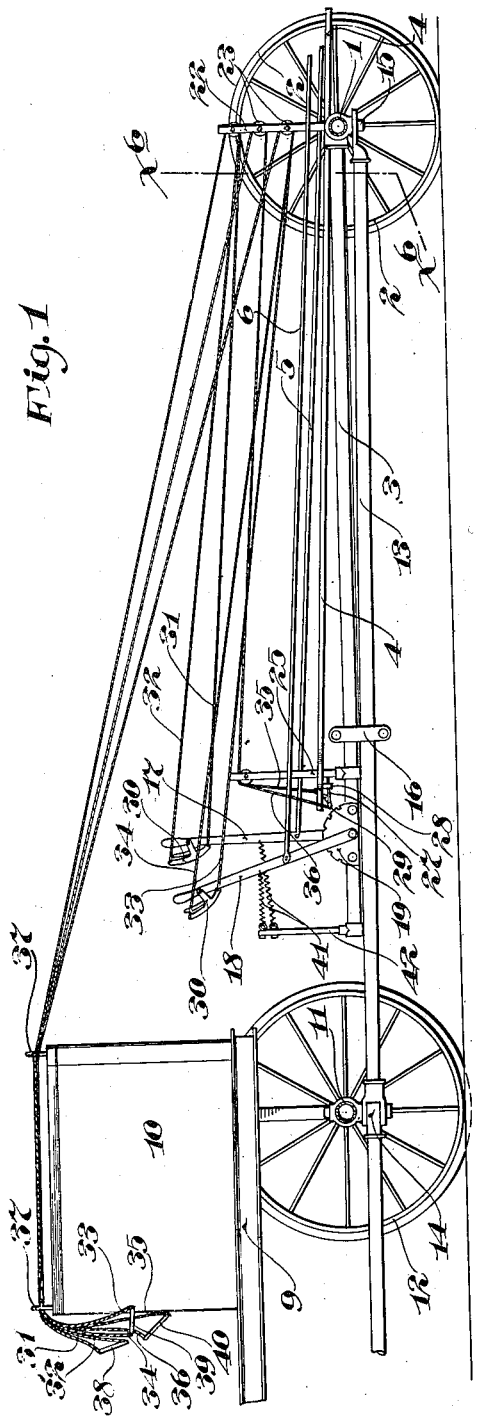
Figure 2:
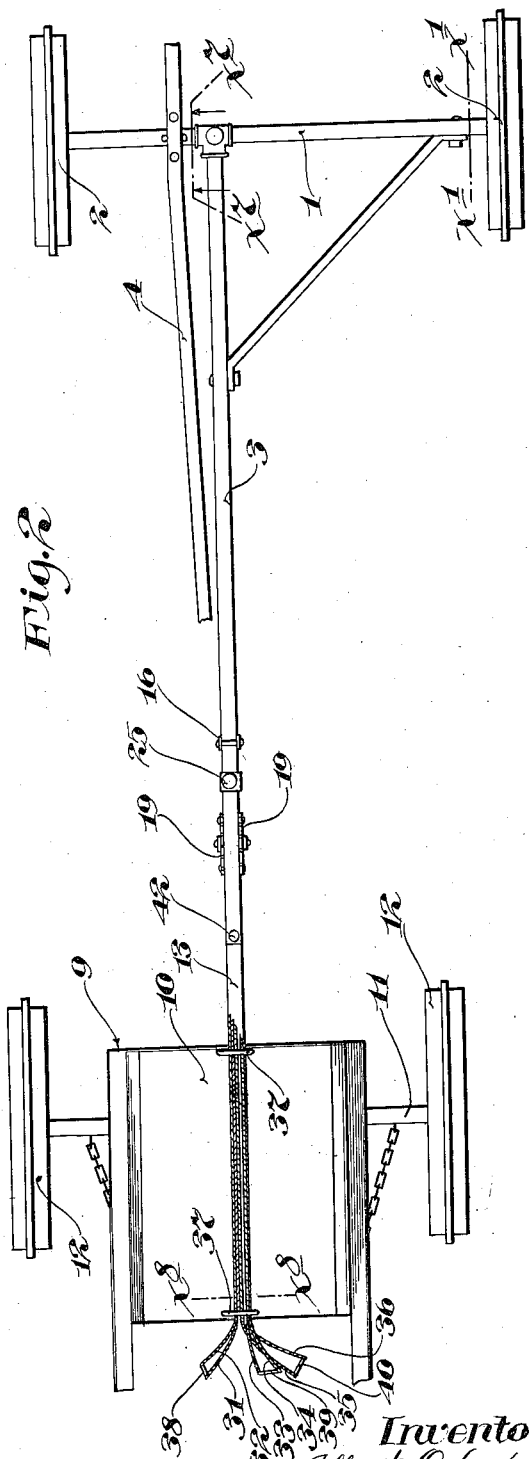

Referring to the drawings, Figure 1 is a side elevation with some parts sectioned on the line $x^1$ $x^1$ on Fig. 2 and with some parts broken away, showing portions of a traction engine and of a harvester of the header type, equipped with my improved controlling mechanism; Fig. 2 is a plan view of the parts shown in Fig. 1; Fig. 3 is an enlarged view chiefly in side elevation, but with some parts sectioned and some parts broken away, showing a portion of the header pole and one of the levers and various other devices applied thereto; Fig. 4 is a horizontal section taken on the line $x^4$ $x^4$ on Fig. 3; Fig. 5 is a vertical section taken on the line $x^5$ $x^5$ on Fig. 4; Fig. 6 is a detail in section taken approximately on the line $x^6$ $x^6$ on Fig. 1; Fig. 7 is a detail in section on the line $x^7$ $x^7$ on Fig. 2; and Fig. 8 is a detail in section taken on the line $x^8$ $x^8$ on Fig. 2.

Of the parts of the header shown in the drawings, the numeral 1 indicates the rear axle, the numeral 2 the rear wheels, the numeral 3 the pole, the numeral 4 the platform tilting lever, the numeral 5 the reel operating rod and the numeral 6 the binder operating rod, the construction and operation of which parts are well understood.

The platform tilting lever 4 is pivoted on the rear axle 1, which, as best shown in Figs. 2 and 7 is provided with a retaining yoke 7 that works between vertical retaining pins 8 driven vertically through the said rear axle 1.

Of the parts of the traction engine shown in the drawings, the numeral 9 indicates the frame, the numeral 10 the engine hood, the numeral 11 the pivoted front axle, the numeral 12 the front wheels. A long pole 13, at its rear end, is pivoted at 14 to the central portion of the front axle 11 of the tractor. The front end of the said pole 13 is attached to the rear axle 1 of the header at 15, and at its intermediate portion, it is rigidly clamped to the intermediate portion of the header pole 3, by means of a coupling clamp 16. The two poles thus rigidly connected together, in effect, constitute a single pole which is pivotally connected to the front axle of the tractor and is rigidly connected to the rear axle of the header. Hitherto, in rigs of this character, it has been the practice to connect the rear ends of the reel and binder operating rods 5 and 6, respectively, to operating levers 17 and 18, and to pivot such levers to coöperating notched lock segments 19, secured on the header pole 3, and to provide the said levers with spring-set latches 20 having releasing hand pieces 21 pivoted to the said levers. Also, it has been common practice, in connection with said levers 17 and 18, and means for raising and lowering the rear end of the tilting lever 4, so as to thereby vary the tilt of the header platform and cutting mechanism, to provide an operator's platform on the rear end portion of the said pole 3, but in front of the tractor. This old and customary arrangement has required one man to operate the traction engine and another to operate the levers 4, 17 and 18. Aside from the additional expense of the extra operator, this extra operator has been placed in a very dangerous position immediately in front of the tractor where, if he should be jolted from his platform or seat, he would fall immediately under the wheels of the tractor.

My invention provides an extremely simple and efficient means whereby the person operating the traction engine, from his position on the tractor may easily, and at will, operate the levers 4, 17 and 18. These improved operating connections are preferably arranged as follows: Rigidly secured to the front end of the pole 3, preferably, at its junction with the rear axle 1 of the header, is an upright standard or column 22, which, as shown, has a long vertical slot in which three guide sheaves 23 are journaled. The so-called tilting lever 4, in its rear end, (see Figs. 3 and 4) is provided with a longitudinal slot 24, through which extends a vertical post 25, the lower end of which is rigidly secured to the pole 3. The front side of this post 25 is provided with vertically spaced perforations 26 adapted to be engaged by a lock bolt 27 that works through a keeper 28 on the said tilting lever 4. The lock bolt 27, as shown, is pivoted to the intermediate portion of a small downwardly spring-pressed arm 29 pivoted to the front end of the tilting lever 4. The spring of the said lever 29 tends to hold the bolt 27 engaged with one or the other of the perforations 26, to thereby normally lock the rear end of the said lever 4 at the desired elevation, and consequently, the platform, not shown, of the header at the desired inclination. Latch operating rockers 30 are pivoted to the upper ends of the levers 17 and 18. Operating cables 31 and 32 are attached, respectively, to the lower and upper ends of the rocker 30 of the lever 17, and, likewise, cables 33 and 34 are attached, respectively, to the lower and upper ends of the rocker 30 on the lever 18. A cable 35 is attached to the rear end of the tilting lever 4 and a companion cable 36 is attached to the free end of the downwardly spring pressed latch operating arm 29. The cables 31 and 32 are passed forwardly and then rearwardly over the upper guide sheave 23 of the pedestal 22; the cables 33 and 34 are passed forward and then rearwardly over the intermediate sheave 23; and the cables 35 and 36 are passed forwardly and then rearwardly over the lower sheave 23. All of these cables 31 to 36, inclusive, are passed through guide brackets 37 on the front and rear portions of the engine hood or casing 10. The rear ends of the cables 31 and 32 are attached to a hand piece 38; the rear ends of the cables 33 and 34 are attached to a similar hand piece 39; and likewise, the rear ends of the cables 35 and 36 are attached to a like hand piece 40. The levers 17 and 18 are connected by quite strong coiled springs 41 to anchoring posts 42 on the extreme rear end of the pole 3. These springs 41, as is evident, serve to move the levers 17 and 18 rearward when their latches are released from the coöperating segments. When it is desired to move the lever 17, either forwardly or rearwardly, to thereby adjust the reel actuating rod 5, the operator, taking hold of the hand piece 38, pulls rearward on the two cables 31 and 32, putting the strain, however, nearly or entirely on the cable 32. This will release the latch 20 of the said lever 17, and then, if the operator pulls simultaneously on the two cables 31 and 32, the said lever 17 will be moved forwardly, while if he gives slack to the said cable 31, the spring 41 will move the said lever rearwardly. By manipulating these two cables, the said lever 17, by a one-hand movement, may be moved either forwardly or rearwardly and its latch set in any notch of the coöperating lock segment 19. The lever 18 which, through the rod 6, moves the binder into different positions, is operated in precisely the same way, by manipulation of the hand piece 39 and cables 33 and 34. By a very similar manipulation of the hand piece 40 and cables 35 and 36, the latch 27 of the tilting lever 4 may first be released and then the rear end of the said lever adjusted to any desired elevation on the post 25 and there locked by giving slack to the cables 36, while the cable 35 is held taut.

From the foregoing, it is evident that with the improved lever actuating devices or connections above described, one man or operator can very easily control and operate not only the traction engine, but also a header pushed by the traction engine. It is, of course, evident that the header will be steered from the traction engine. For instance, if the header is to be turned to the right, the front end of the tractor, and consequently, the rear end of the pole 13 will be turned inward to the left.

What I claim is:

1. The combination with a front vehicle and a rear vehicle coupled thereto, of an actuating latch lever for the front vehicle located in front of said rear vehicle, yielding means tending to move said latch lever in one direction, a vibratory latch operating member on said latch lever, and a pair of oppositely acting cables attached to said vibratory latch operating member and extended rearward to said rear vehicle, and adapted to be given differential rearward movements to vibrate said latch operating member and to be given simultaneous and equal rearward movements to move said lever against the tension of its yielding actuated means.

2. The combination with a rear wheeled vehicle, a front wheeled vehicle and a pole connecting the same, of an actuating lever in said front vehicle mounted on said pole and provided with latch mechanism including an intermediately pivoted latch operating rocker, cable guides carried with said front vehicle ahead of said lever, a spring tending to move said lever rearward, a pair of cables attached to the opposite ends of the latch controlling rocker of said lever, said cables being extended forward over said cable guides and thence rearward through guides on said rear vehicle, and a floating hand piece attached to the rear ends of said cable and adapted to be held in the hand and thereby moved bodily rearward and to be given angular movement to thereby control the latch of said lever and the forward and rearward movements of said lever.

In testimony whereof I affix my signature in presence of two witnesses.

ALBERT O. LEE.

Witnesses:
BERNICE G. WHEELER,
HARRY D. KILGORE.